(No Model.)

S. D. SMITH.
STEAM CANNING COOKER.

No. 510,718. Patented Dec. 12, 1893.

Witnesses.
A. Ruppert.
G. B. Towles

Inventor.
Stephen D. Smith
Per
Thomas P. Simpson
Atty

THE NATIONAL LITHOGRAPHING COMPANY,
WASHINGTON, D. C.

UNITED STATES PATENT OFFICE.

STEPHEN DECATUR SMITH, OF ORLANDO, FLORIDA.

STEAM CANNING COOKER.

SPECIFICATION forming part of Letters Patent No. 510,718, dated December 12, 1893.

Application filed April 18, 1893. Serial No. 470,876. (No model.)

*To all whom it may concern:*

Be it known that I, STEPHEN DECATUR SMITH, a citizen of the United States, residing at Orlando, in the county of Orange and State of Florida, have invented certain new and useful Improvements in Steam Canning Cookers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make an attachment for cooking stoves or ranges by which fruits, meats or vegetables may be steamed and cooked to the extent necessary, for canning purposes.

Figure 1:
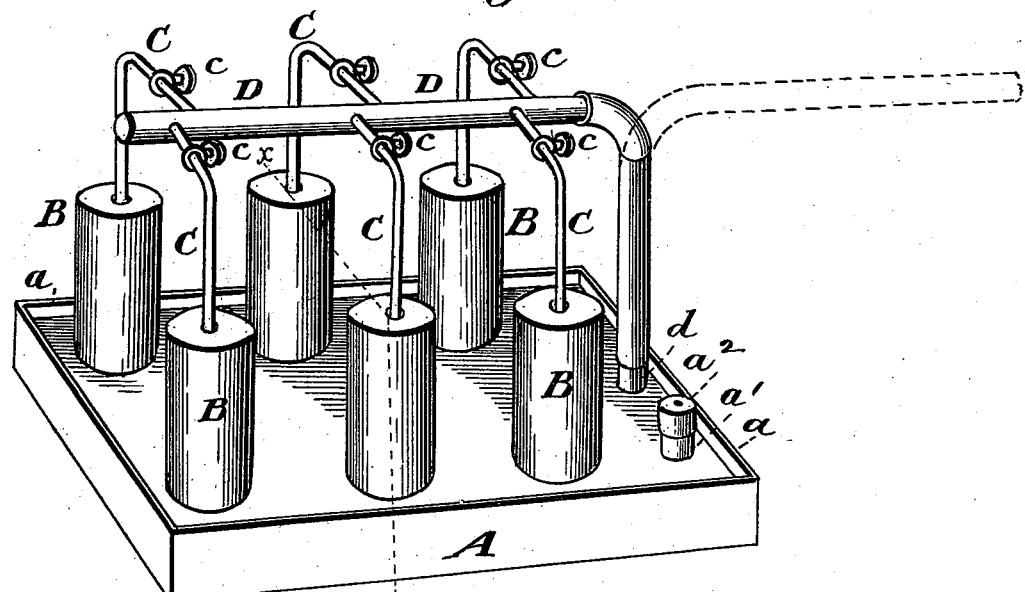
Figure 2:
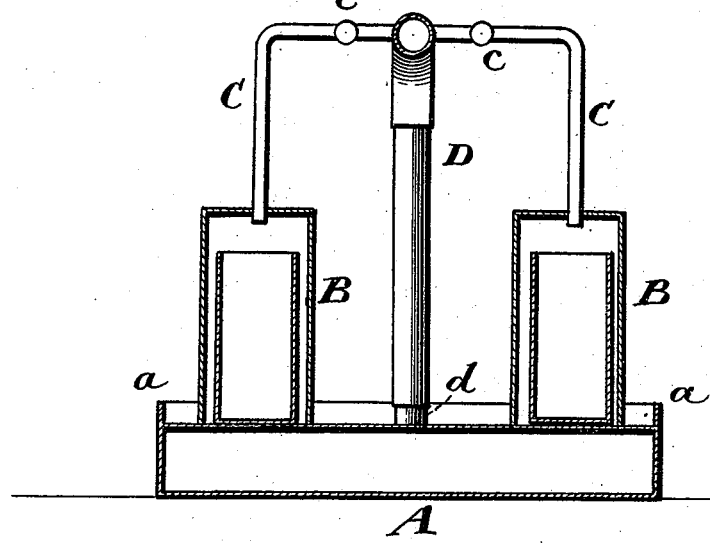

Figure 1 of the drawings is a perspective view of my attachment and Fig. 2 a vertical section thereof on the dotted line $xx$ of Fig. 1.

In the drawings, A represents the steam generator which is a shallow metallic vessel of any preferred form, covered on top and provided with an upwardly projecting rim or flange $a$ around the edge so as to hold a thin sheet of water. In these are placed the cans.

B are the receivers made open at the bottom but closed at the top and arranged in two parallel rows, one on each side of the middle or otherwise if desired. They are connected at the top by the pipes C with the median pipe D which turns down and communicates with the generator A so as to furnish the proper supply of steam to each receiver B.

The generator A, has on top an inlet $a'$ through which water finds an entrance and which is provided, if desired, with a suitable cap $a^2$ apertured to allow the escape of steam with a whistling sound whenever the water is getting too low. This is however not absolutely necessary.

The steam supply pipe D is adjusted on the opening in the generator by means of a collar $d$ and may be provided with an elbow or curved joint or may be extended by means of pipes and joints to a table where the cooking may be done away from the hot stove or range, as shown in Fig. 1 of the drawings.

The distributing pipes C are provided with stop cocks $c$ to shut off steam from one or more of them when not needed or when changing fruit cans, and also serve as a holder for the receivers when the latter are not in use, by simply pushing the receivers back upon the tube.

The receivers B are preferably made of metal with an aperture in the center of top to receive the pipes C, which are threaded to screw into pipe D or soldered if the pipes are made of tin. They are of course made somewhat higher and of greater diameter than the ordinary can so as to leave a space for steam around the can.

The generator A is first filled partly with water and placed on the stove or other heater, when a thin sheet of water is formed on the top and within the rim or flange $a$. This is done to prevent the too rapid escape of steam at the bottoms of the receivers B, as this water will also boil and furnish an additional supply of steam and heat to the receivers so as to hasten the operation.

The cooking or partial cooking of the fruits and vegetables by steam preserves their natural flavor and causes them to retain their true color. The partial cooking is thought to kill the microbes or germs of fermentation and when hermetically sealed, will perfectly preserve the product and thus render canned goods a very healthy food.

Having thus described all that is necessary to a full understanding of my invention, what I claim as new, and desire to protect by Letters Patent, is—

A canning attachment for cooking stoves or other heaters, consisting of the steam generator A and receivers B connected by the pipes D C, the generator being provided with the rim or flange $a$, as and for the purpose set forth.

In testimony whereof I affix my signature in presence of two witnesses.

STEPHEN DECATUR SMITH.

Witnesses:
 L. G. STARBUCK,
 SARAH L. ARMO.